United States Patent
Calhoun et al.

(10) Patent No.: US 8,325,563 B2
(45) Date of Patent: Dec. 4, 2012

(54) SYSTEMS AND METHODS OF LOCATING WEAPON FIRE INCIDENTS USING MEASUREMENTS/DATA FROM ACOUSTIC, OPTICAL, SEISMIC, AND/OR OTHER SENSORS

(75) Inventors: Robert B. Calhoun, Oberlin, OH (US); Robert L. Showen, Los Altos, CA (US); James G. Beldock, Mountain View, CA (US); Scott M. Manderville, Georgetown, IN (US); Jason W. Dunham, San Francisco, CA (US)

(73) Assignee: Shotspotter, Inc., Mountain View, CA (US)

( * ) Notice: Subject to any disclaimer, the term of this patent is extended or adjusted under 35 U.S.C. 154(b) by 1041 days.

(21) Appl. No.: 12/154,968

(22) Filed: May 27, 2008

(65) Prior Publication Data
US 2012/0182837 A1  Jul. 19, 2012

Related U.S. Application Data

(60) Provisional application No. 60/939,884, filed on May 24, 2007.

(51) Int. Cl.
*G01S 3/808* (2006.01)
(52) U.S. Cl. .................... 367/127; 367/129; 367/906
(58) Field of Classification Search .......... 367/127–129, 367/906
See application file for complete search history.

(56) References Cited

U.S. PATENT DOCUMENTS

| | | | | |
|---|---|---|---|---|
| 4,350,881 A * | 9/1982 | Knight et al. | ................. | 367/906 |
| RE32,123 E * | 4/1986 | Knight | ........................... | 367/127 |
| 5,128,904 A * | 7/1992 | Chambers | ..................... | 367/129 |
| 5,912,862 A * | 6/1999 | Gustavsen et al. | ............ | 367/129 |
| H0001916 H * | 11/2000 | Hollander | ..................... | 367/118 |
| 6,215,731 B1 * | 4/2001 | Smith | ........................... | 367/128 |
| 6,621,764 B1 * | 9/2003 | Smith | ........................... | 367/128 |
| 7,233,546 B2 * | 6/2007 | Berkovich et al. | ............ | 367/128 |
| 7,372,773 B2 * | 5/2008 | Horak | ........................... | 367/129 |
| 7,710,828 B2 * | 5/2010 | Barger et al. | ................. | 367/127 |
| 2010/0226210 A1 * | 9/2010 | Kordis et al. | ................. | 367/127 |

\* cited by examiner

*Primary Examiner* — Ian Lobo
(74) *Attorney, Agent, or Firm* — DLA Piper LLP US

(57) ABSTRACT

Systems and methods are disclosed for locating a weapon fire incident such as an acoustic transient from a gunshot, explosion, weapons launch, etc. In one exemplary implementation, there is provided a method of locating the incident from a combination of propagation phenomena including a discharge time of the weapon fire incident. Moreover, the method may include obtaining a first propagation parameter of the incident from one or more first sensors, obtaining the discharge time from another sensor, and processing the data to determine a location using a common time basis among sensor measurements. According to further exemplary implementations, the discharge time may include a transient event that has a different propagation velocity than that of sound in the atmosphere.

2 Claims, 9 Drawing Sheets

SYSTEMS AND METHODS OF LOCATING WEAPON FIRE INCIDENTS USING MEASUREMENTS/DATA FROM ACOUSTIC, OPTICAL, SEISMIC, AND/OR OTHER SENSORS

CROSS-REFERENCE TO RELATED APPLICATIONS

This application claims the benefit of U.S. provisional application No. 60/939,884, filed May 24, 2007, which is incorporated herein by reference in entirety.

BACKGROUND

1. Field

The present innovations relate generally to methods and systems associated with locating weapon fire incident using sensor arrays. More specifically, innovations herein relate to techniques for locating the incident as a function of a combination of measured propagation phenomena including a discharge time.

2. Description of Related Information

Existing acoustic counter-sniper or gunshot/weapon discharge location systems sometime detect and locate gunshots by measuring the time of arrival of the muzzle blast on three or more time-synchronized microphones of known position. In some implementations, each acoustic sensor may have a single microphone capable of measuring time of arrival only; in other implementations each acoustic sensor may have multiple microphones, enabling each to measure both time of arrival and an angle of arrival in two (and sometimes three) dimensions. In some existing systems, two or more of such acoustic sensors may be combined to form an acoustic sensor array.

Drawback of such arrays include location accuracy limited by sensor array position and/or geometry. For example, three or four sensors may be sufficient to provide an accurate location when the shooter is confined within the convex hull defined by those sensors detecting the incident. As the shooter moves outside the polygon defined by the sensors, however, bearing accuracy (defined as the difference between the calculated and actual angle from the center of the array to the shooter) may remain acceptable but range accuracy (defined as the difference between the calculated and actual distance from the center of the array to the shooter) deteriorates. Graphically, a location solution can be constructed by intersecting linear azimuths of arrival from two or more sensors and/or hyperbolic lines of constant time difference of arrival from three or more pairs of sensors. The angle at which these lines intersect at the location is indicative of the quality of the range estimate, with a low angle indicating low accuracy and a high angle indicating high accuracy. As such, given an acoustic aperture $\lambda$ as the width of the acoustic array perpendicular to the line from the array center to the shooter; for muzzle-only acoustic solutions, range accuracy begins to deteriorate as $\rho\backslash\lambda > 2$ where r is the actual range to the shooter (see, e.g., FIGS. 2 and 3).

To overcome this drawback, some gunshot location systems make additional use of the sound emitted by a supersonic projectile while it is in flight. Good estimates of shooter range can be obtained when a sufficient number bullet sound times and/or angles of arrival can be measured and an accurate ballistic model for the projectile is available. Such systems require that the projectile pass close enough to the acoustic sensor for the projectile noise to be detectable, and they are less suitable for use in urban situations where structures preclude detection of bullet sounds.

Other existing counter-sniper/gunshot location systems are based on detection of the muzzle flash, a bright flare of burning propellant emitted from the barrel of a weapon when it is discharged. However, such gunshot location system require a clear line of sight to the shooter's position. Furthermore, flash suppressors can reduce the intensity of light emitted by the muzzle flash, complicating detection. As with out-of-array location by acoustic sensor arrays, some optical systems may provide accurate bearing (direction) to the shooter but are less accurate at estimating range.

In still other existing systems, seismic sensors arrays are used to detect explosions, especially large explosions such as those created by underground testing of nuclear weapons. While certain overly complex and/or expensive seismic sensor networks can be used to locate the source of the explosion, the accuracy of seismic systems is dependent on the array geometry in a manner similar to acoustic systems.

In sum, there is a need for systems and methods that may accurately locate a weapon fire incident by, for example, using propagation phenomena including a discharge time obtained and/or processed via more advantageous arrangements of sensors or functionality.

SUMMARY

Systems and methods consistent with the invention are directed to locating weapon fire incidents.

In one exemplary embodiment, there is provided a method of locating the incident from a combination of propagation phenomena including a discharge time of the weapon fire incident. Moreover, the method may include obtaining a first propagation parameter of the incident from one or more first sensors, obtaining the discharge time from another sensor, and processing the data to determine a location using a common time basis among sensor measurements.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely examples consistent with certain aspects related to the invention. Wherever possible, the same reference numbers will be used throughout the drawings to refer to the same or like parts.

A developing requirement of weapon fire location systems, such as acoustic counter-sniper or gunfire/gunshot location systems, is that they are capable of providing one or both of improved features, such as reduced quantities of sensors, or improved functionality, such as locating events originating outside the array of sensors and/or providing accurate bearing and range estimates even when certain phenomena such as bullet sounds are not detectable. The drawbacks of each of the systems described above can be overcome by the innovations set forth below.

Figure 1:
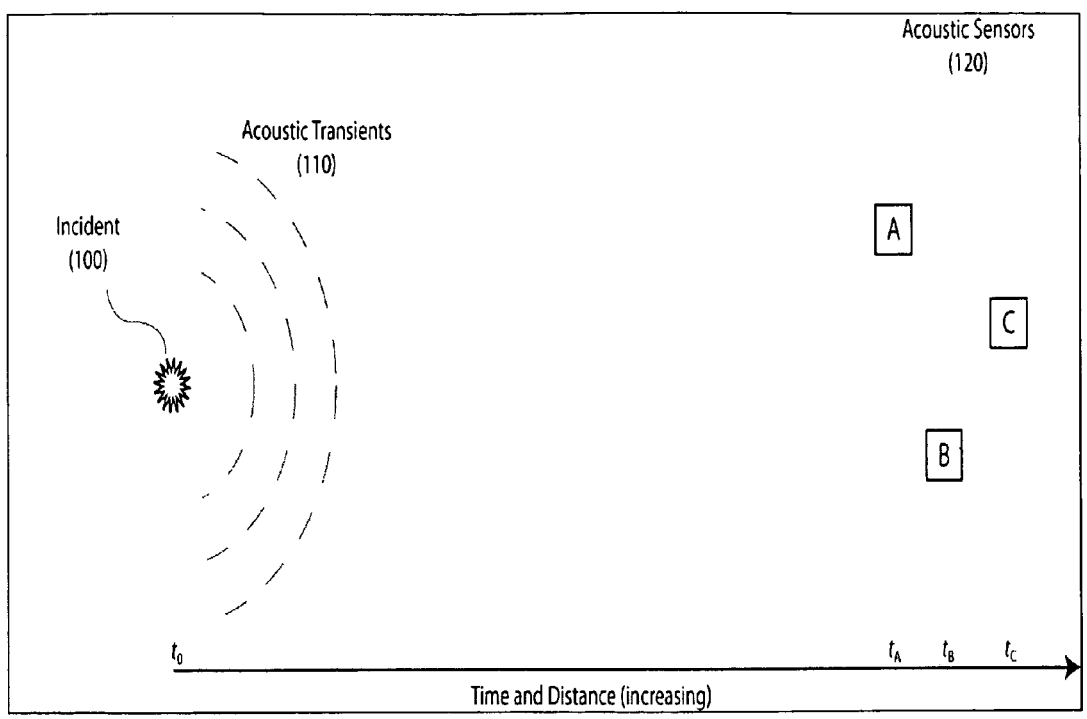
FIG. 1 is a diagram of an existing acoustic sensing system/environment.
Figure 2:
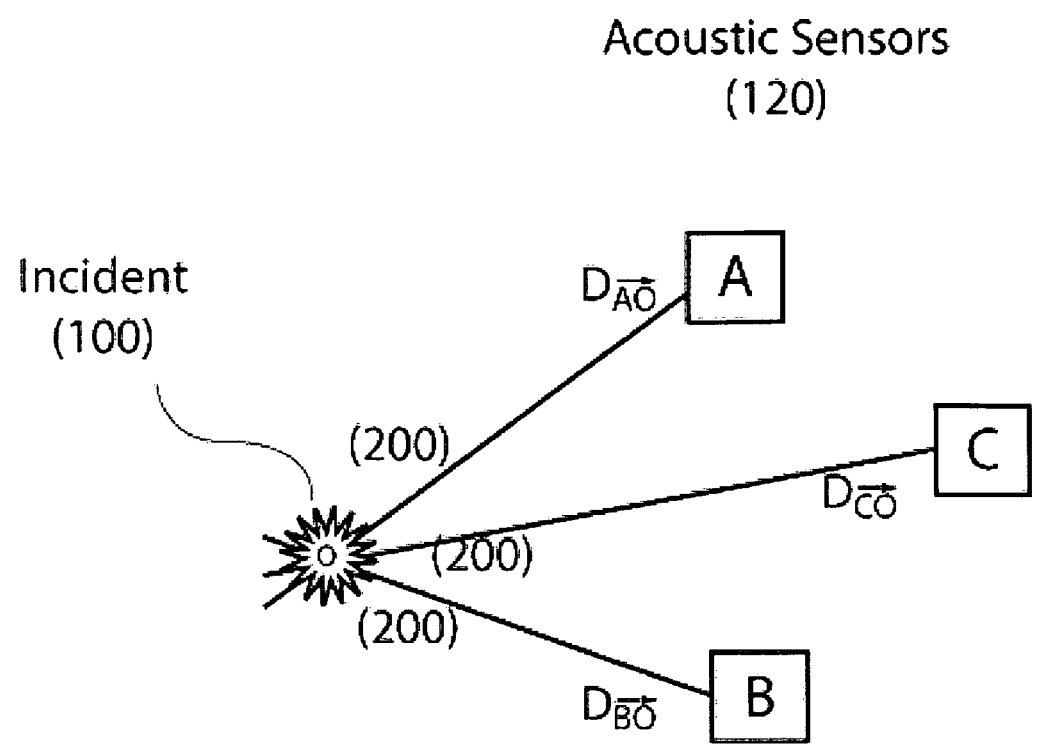
FIG. 2 is a diagram of an exemplary acoustic system/environment illustrating features consistent with certain aspects related to the innovations herein.
Figure 3:
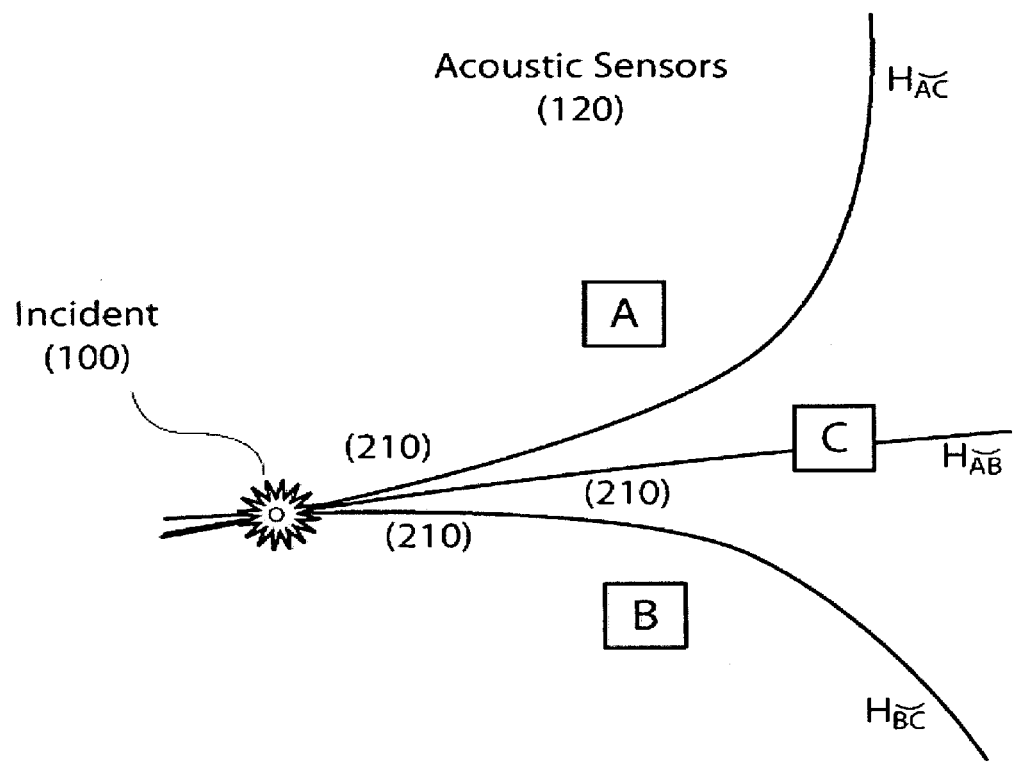
FIG. 3 is a diagram of an exemplary acoustic system/environment illustrating features consistent with certain aspects related to the innovations herein.

FIGS. 1-3 are diagram illustrating exemplary acoustic sensing systems/environments consistent with certain aspects related to the innovations herein. Referring to FIG. 1, the illustrated environment includes the weapon fire incident 100, the transients created by the incident 110, and three acoustic sensors 120. Referring to FIG. 2, the environment is similar to FIG. 1 with an incident 100 and sensors 120. Additionally represented are the straight line bearing solutions 200 provided by the sensors. Referring to FIG. 3, the environment is again the same with an incident 100 and the sensors 120. FIG. 3 also illustrates the hyperbolic lines of constant difference in time of arrival for each pair of sensors 210.

In a representative acoustic-only weapons detection/location system such as that in FIG. 1, an acoustic incident 100 occurs at a time $t_0$. Acoustic waves 110 carry the acoustic transient(s) to one or more acoustic sensors 120, labeled individually Sensor A, Sensor B, Sensor C. Based on the difference in time of arrival and/or angle of arrival of these transients at each sensor, a purely acoustic system location system generates a series of equations defining the possible points of origin of that transient. These equations are either straight lines (when the acoustic sensor is capable of detecting direction) or hyperbolic (when the times of arrival of the muzzle blast are compared at two sensors, thus producing a hyperbolic line of constant difference). The best-fit intersection of the lines and/or curves defined by these equations is then computed, and a location for the incident thus estimated. In FIG. 1, the times of arrival of the acoustic transient at each of Sensors A, B, etc. are denoted $t_A$, $t_B$, etc.

Figure 4:
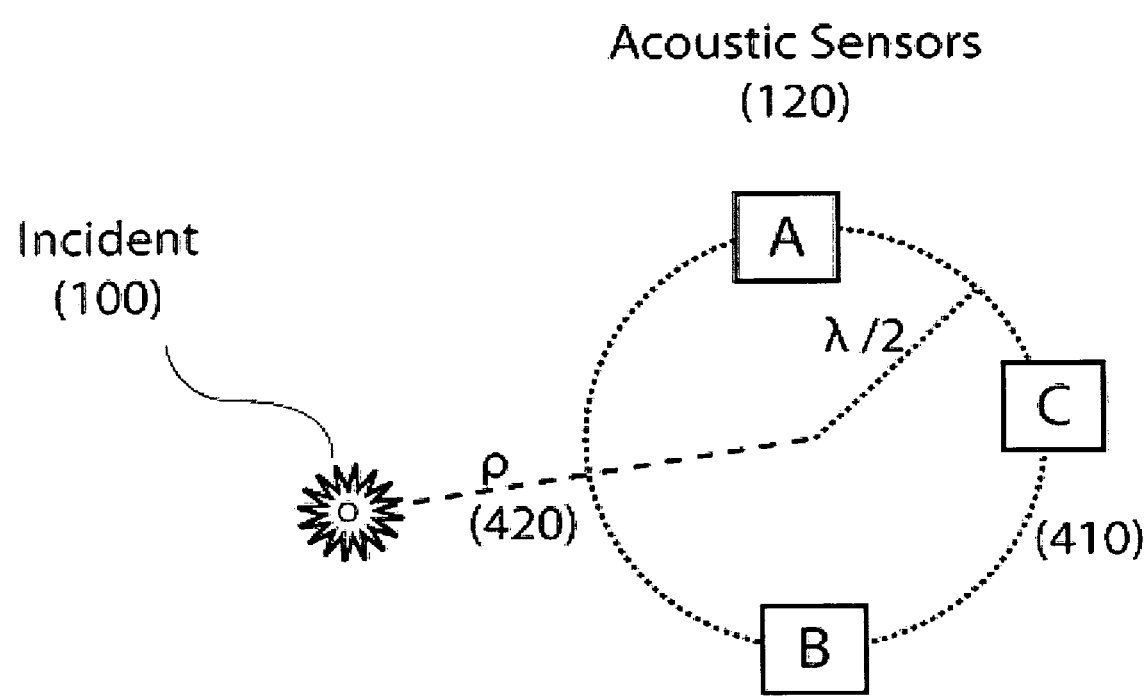
FIGS. 4 and 5 are diagrams illustrating exemplary aspects of error that may be introduced as the distance between the incident and the array is increased, consistent with certain aspects related to the innovations herein.

In such a system, lines of azimuth 200 can be plotted originating at some or all directional acoustic sensor(s) 120 towards the direction of the origin of the acoustic transient 100, as shown in FIG. 2 and denoted $D_{\overline{AO}}$, $D_{\overline{BO}}$, etc. Similarly, comparing the times of arrival of the transients at, e.g., Sensors A and B, hyperbolic lines of constant difference in time of arrival 210 can be plotted for any given pair of sensors, as shown in FIG. 3, and denoted $H_{\overline{AB}}$, $H_{\overline{BC}}$, etc. As the distance between the sensor array and the incident increases, errors begin to have a significant impact on the accuracy of range calculations, as illustrated in FIG. 4. If we define a radial measurement of a circle 410 as the acoustic aperture λ of sensor array, and the distance between the incident and the array as ρ 420, then when the ratio of ρ to λ is >2, the errors become significant and range accuracy decreases. Details of how differing distances affect the calculation are set forth in more detail below in connection with FIGS. 4 and 5.

The innovations herein are directed to systems and method of locating the source of a weapon fire incident, such as an acoustic transient, gunshot, explosion, or weapons launch. Exemplary implementations may include obtaining a first propagation parameter of the weapon fire incident from one or more first sensors in conjunction with obtaining a discharge time of the weapon fire incident from a second sensor, wherein the second sensor includes a non-acoustic sensing element. Some of the innovations may be achieved, e.g., by combining one or more propagation phenomena, such as acoustic time of arrival or angle of arrival measurements, with one or more time of arrival measurements made of an alternative signal. According to further implementations, the alternative signal may have a different propagation velocity than that of sound in the atmosphere. For example, when the alternative signal being measured is light or radio-frequency emission, such a measurement may provide a direct measurement of the discharge time of the acoustic transient event due to the high velocity of light compared to that of sound in air. When the alternative signal is generated using an active method which transmits some form of energy and then measures the interaction between that transmission and the phenomena to be measured, the discharge time or bearing can be determined from the projectile reflection. When the alternative signal is an acoustic signal that propagates via a medium other than the atmosphere (such ground, water, etc.), the discharge time can be estimated from the measurements of the arrival times in both media and the known velocities of sound in those media. Alternatively, an estimate of discharge time can be derived from the acoustic data itself by measuring the spacing of various acoustic transients (such as the difference between time of arrival of a supersonic bullet sound vs. time of arrival of muzzle blast), from analysis of the degradation of some aspect of the signal (such as changes in signal power spectrum and/or signal amplitude as it propagates through a medium), or from an external source designed to measure such discharge time, such as an acoustical sensor worn by the person discharging the weapon. Additionally, the discharge time may also be estimated by subtracting the travel time to each sensor from the arrival time on each sensor based on a preliminary estimate of the weapon fire incident's location computed by traditional techniques using a subset of reporting sensors.

In certain further implementations, once the discharge time is known or estimated, systems and methods consistent with the innovations herein may further include processing first sensor data from the one or more first sensors along with second sensor data from the second sensor using a common time base between sensors, and determining a location of the weapon fire incident as a function of the first propagation parameter and the discharge time. As set forth in more detail below, a more accurate location of the source of the incident or transient may be obtained by combining the discharge time estimate with one or more propagation phenomena, such as times of arrival and/or directions of arrival. As such, one advantage of innovations herein is that the solution for the combined n times of arrival and m angles of arrival problem is reduced to (n+m) linear equations by the introduction of the discharge time $t_0$, solutions for which are well-known to those skilled in the art.

For mixtures of different signal types (acoustic, optical, seismic, etc.) to be used together to compute the location of gunshot or other signal source, each measurement must be made using a common time basis and coordinate system. This time basis may be relative, with each sensing element using a common relative time such as time from a radio pulse or synchronizing electronic signal, or an absolute time, such as Coordinated Universal Time (UTC). Methods for using relative times include connecting collocated optical and azimuth acoustic sensors together with a clock signal. Synchronized relative timing may be extended to a distributed system by means of sending timing messages via any standard communication method in which the communications latency is either small or known and compensated for. Some exemplary techniques for obtaining an absolute time reference on each sensor include atomic clocks, Network Time Protocol implementations and GPS receivers. Because GPS receivers provide both a suitable coordinate system (WGS84 datum projected coordinate system) and a suitable time reference (GPS time and/or UTC), and work anywhere in the world, they afford particular advantages when used as components in the innovations herein.

Figure 5:
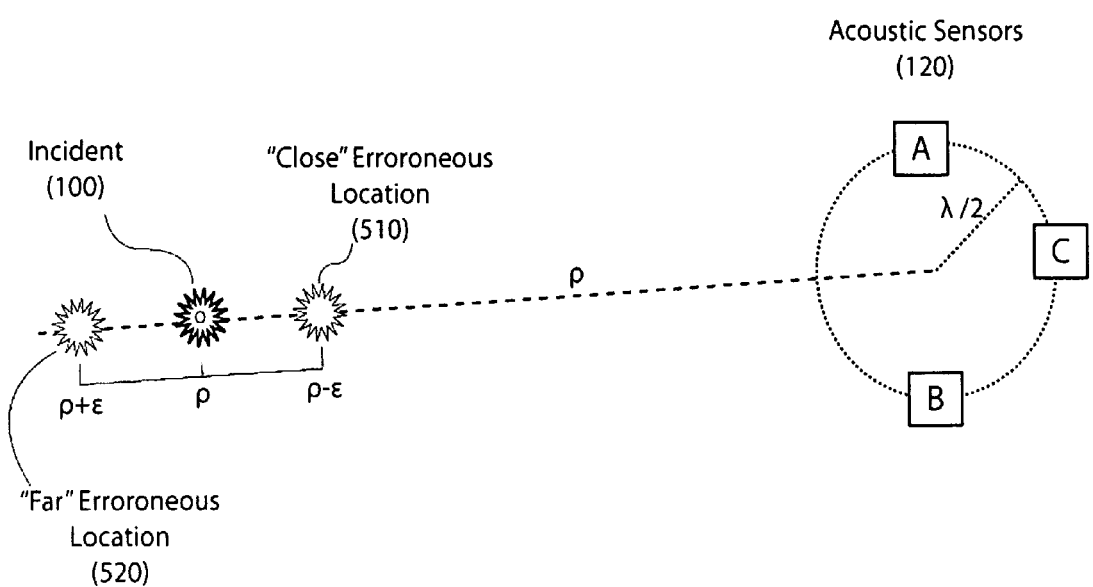

FIGS. 4 and 5 are diagrams illustrating exemplary aspects of error that may be introduced as the distance between the incident and the array is increased, consistent with certain aspects related to the innovations herein. Returning to azimuthal or hyperbolic solutions, at large $\rho:\lambda$ ratios, the lines of intersection of any combination of azimuth or hyperbola are effectively parallel as distance increases, and thus a small perturbation (error) in $D_{\overline{AO}}$ or $H_{\overline{AB}}$ (etc.) will have a disproportionate impact on the location along the line $\rho$. If we denote the error in range estimate $\epsilon$, then erroneous locations 510 and 520 can appear along the line, as noted in FIG. 5. Such errors can be a function of any combination of one or more of inaccuracies in knowledge of sensor position, time, velocity, wind, atmospheric conditions, multipath, echoes, etc., though may be overcome by the various arrangements and processing features set forth herein.

Figure 6:
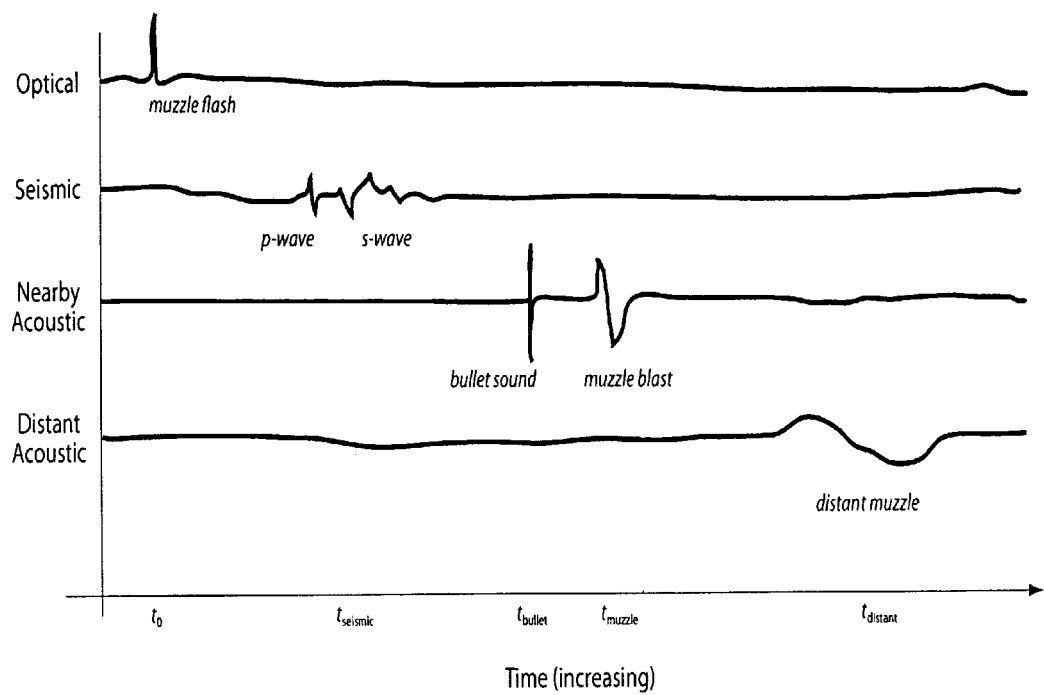
FIG. 6 is a diagram illustrating various time-domain representations of different types of signals, consistent with certain aspects related to the innovations herein.

Once all sensors are arranged on a common coordinate system and time basis, measurements made by several sensors can be used together in a location solution by estimating the discharge time $t_0$ of the gunshot event and transforming the time of arrival and azimuth of arrival measurements made by acoustic sensors appropriately. In one exemplary implementation, the first step is to estimate the discharge time $t_0$, which may be accomplished in several ways depending on the alternative signal which is being measured. FIG. 6 is a diagram illustrating various time-domain representations of a variety of such alternative signals, such as optical, seismic and acoustic signals, consistent with certain aspects related to the innovations herein. Some particularities of systems including optical or seismic sensors are set forth immediately below, and aspects consistent with acoustic sensors are disclosed throughout.

Optical devices: the speed of light is sufficiently fast that a muzzle flash detection time measured by an optical flash device with synchronized timing can be used as a discharge time without further processing. The accuracy of such measurement is dependent on the details of the sensor design, such as the effective frame rate of the sensing device and its ability to detect the leading edge of the optical signal. For example, an optical flash detector with a frame rate of 60 Hz might have discharge time measurement accuracy of 17 milliseconds. Advantageously, inaccuracies in the measurement of the discharge time result in only a linear reduction in the range accuracy of a combined optical-acoustic system. Since the speed of sound is ~350 m/sec, combining a 17 millisecond accuracy discharge time with a 1 millisecond accuracy time of arrival measurement from an acoustic sensor yields a range measurement accurate to about 6 meters.

Seismic or hydrophonic devices: because optical sensors are limited by the line-of-sight requirement, the present invention can also make use sensors which measure sound waves that travel through the earth or water. A seismic sensor can be used to estimate the discharge time by combining the seismic time of arrival with atmospheric times of arrival and estimates of the velocity of sound in the two media. For co-located sensors, the discharge time $t_0$ is then $$t_0 = \frac{v_g t_g - v_s t_s}{v_g - v_s}$$

where $v_s$ is the speed of sound in air, $v_g$ is the speed of sound in the ground, $t_s$ is the time of arrival in air and $t_g$ is the time of arrival in the ground. Similar solutions can be obtained when the sensors are not co-located. The speed of sound in the ground is an order of magnitude faster than the speed of sound in air, yielding good discharge time resolution. Seismometers and geophones with sufficient sensitivity are available for use as components in the present inventions. This method is especially suitable for locating the source of acoustic transients with good ground coupling, such as the discharge of artillery or tank fire.

Another direct measurement of the discharge time, consistent with aspects of the innovations herein, can obtained from a device designed to measure this time, such as an acoustic sensor worn directly on a person discharging the weapon. According to these exemplary systems, the position of the shooter is usually known as well; this method may be used to facilitate removal of friendly fire impulses from a gunshot location system designed primarily to find hostile parties. In this case the discharge time $t_0$ is equal to the acoustic detection time; to use this measurement in the present invention, the sensor need only identify the transient detected as a self-discharge event, via a technique such as comparing the signal amplitude with a known level that is exceeded only in the case of self-discharge.

Once $t_0$ is estimated, it can be used to compute the gunshot location $(x_0, y_0)$ as follows. Each reporting acoustic sensor located at $(x_i, y_i)$ provides a time of arrival measurement $t_i$. Equating the shooter-sensor distance with the product of time of flight and speed of sound yields:

$$\sqrt{(x_0-x_i)^2+(y_0-y_i)^2}=(t_i-t_0)v_s.$$

Graphically, this is a circle centered on each sensor with a radius equal to the acoustic travel distance where the circle has radius $$r_i=(t_i-t_0)v_s.$$

Squaring both sides and expanding terms gives:

$$x_0^2-2x_0x_i+x_i^2+y_0^2-2y_0y_i+y_i^2=r_i^2.$$

Since the quadratic terms appear in isolation, it can be eliminated by subtracting the $(i+1)^{th}$ sensor from the $i^{th}$ sensor, which yields:

$$(2x_{i+1}-2x_i)x_0+(2y_{i+1}-2y_i)y_0=x_{i+1}^2+y_{i+1}^2-x_i^2-y_i^2+r_i^2-r_{i+1}^2.$$

Figure 7:
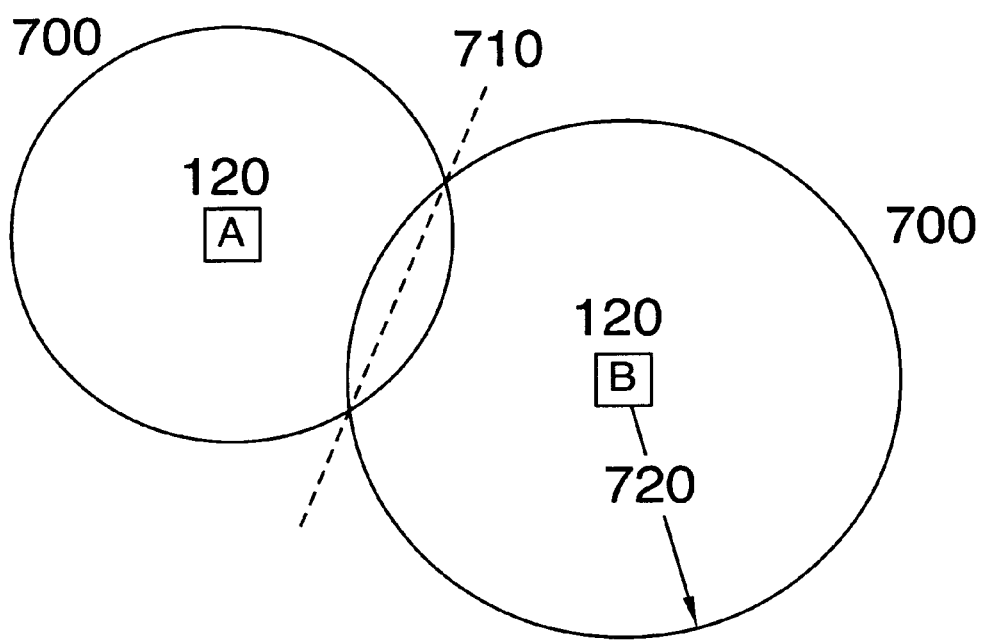
FIGS. 7-9 are diagrams depicting graphical illustrations of various weapon fire incident location information used to determine a location, consistent with certain aspects related to the innovations herein.

Substitution of known sensor positions and arrival times gives n equations that are linear in $x_0$ and $y_0$. The same result can be constructed graphically by drawing the line through the two points defined by the intersection of two circles on the plane, as illustrated in FIG. 7. As shown in FIG. 7, knowledge of discharge time $t_0$ restricts unknown gunshot location to circles 700 of radius $v_s$ $(t_i-t_0)$ 720 centered on each sensor 120. The intersection of two circles defines a line 710 that goes through the two points of intersection. Best-fit solutions may then be used to resolve any ambiguities in the location calculations. Further, while a variety of best-fit solutions to the problem of n lines intersecting on the plane are well-known to those skilled in the art, certain exemplary techniques, such as those based on singular value decomposition, provide particularly innovative determinations (in the least-squares sense) of single points of intersection, consistent with the innovations herein.

Figure 8:
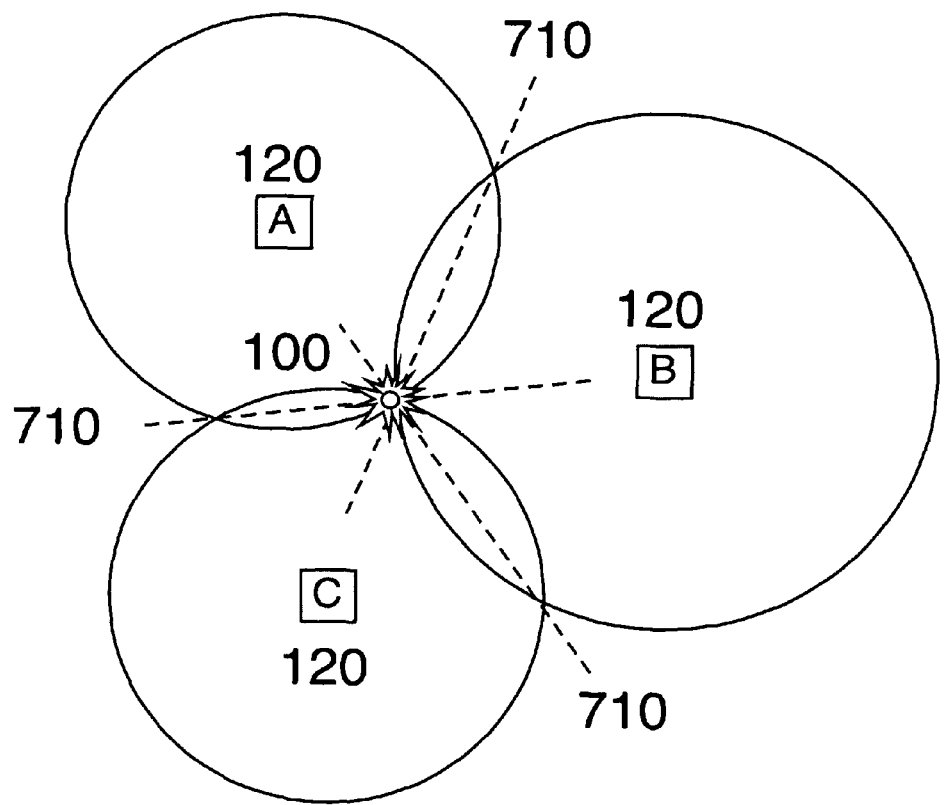
Figure 9:
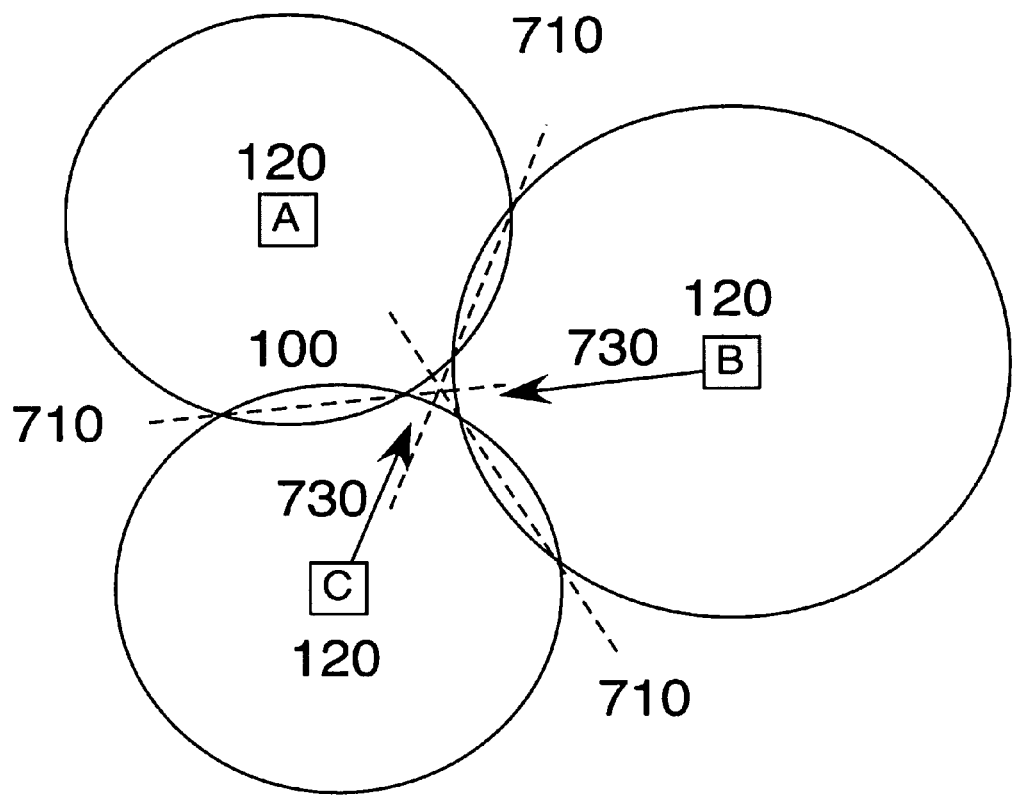

Like FIG. 7, FIGS. 8 and 9 are diagrams graphically depicting intersections of additional weapon fire incident location information used to determine a location, consistent with certain aspects related to the innovations herein. As shown in FIG. 8, when combined with a known discharge time, three sensors (120) and three time of arrival measurements correspond to three pairs of circles. The lines defined by the intersection of pairs of circles 710 intersect at the weapon fire incident's location 100. FIG. 9 illustrates another advantage, consistent with certain innovations herein, wherein time of arrival and azimuth of arrival may be combined in the same location solution. Referring to FIG. 9, known discharge time plus three sensors 120 and three time of arrival measurements defined three pairs of circles. The lines defined by the intersection of pairs of circles 710 intersect at the weapon fire incident's location 100. Further, angle of arrival measurements 730 made at sensors B and C point towards the incident location 100. Moreover, since all measurements have been converted into lines or linear representations, a general line of intersection algorithm suffices to solve for the location.

Use of the discharge time measured by a different sensor type thus allows the gunshot location problem to be linearized. This is of great utility because it allows for the joint use of both time of arrival and angle of arrival measurements (made by both acoustic and optical systems) in the same solution. The time of arrival measurements are linearized using the above method and angle of arrival measurements are converted to lines in the plane using the familiar point-slope form of a line. Once the discharge time $t_0$ is known, the process above allows a problem of n times of arrival and m angles of arrival to be converted into the intersection of (n+m) lines, for which there exist many efficient methods for finding the best-fit solution.

Because of the flexibility of the discharge time technique, there is value in applying the above method even when no optical or seismic sensor estimate of the discharge time is available. In these cases, the discharge time can be estimated by one of several indirect techniques, including but not limited to: comparing the power spectrum and amplitude of the muzzle blast with predictive models of acoustic attenuation with distance; measurement of the bullet pulse-muzzle pulse spacing on several sensors; measurement of bullet pulse and muzzle pulse angles of arrival on several sensors; radar imaging of the projectile and estimating the discharge time from its trajectory; and back-computation of discharge time from a traditional triangulation location on three or more acoustic sensors. Such techniques vary in their accuracy, with the acoustic propagation techniques being the most sensitive to environmental conditions and thus most variable. In the case of back-computation from acoustic sensors, the advantage of the invention is that it allows times of arrival and angles of arrival to both participate in the final location solution, improving the overall flexibility and robustness of the resulting gunshot and transient acoustic event location system.

As disclosed herein, embodiments and features of the present innovations may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe signal processing components such as software, systems and methods consistent with the present invention may be implemented with any combination of hardware, software and/or firmware. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage medium or element or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

The invention claimed is:

1. A method of locating a weapon fire incident, the method comprising:
    obtaining a first propagation parameter of the weapon fire incident from one or more first sensors, wherein each first sensor includes an acoustic sensing element, wherein the propagation parameter includes a first arrival time of a first signal from the weapon fire incident, and wherein the first signal's propagation velocity is the speed of sound through air;
    obtaining a second arrival time of a second signal based on the weapon fire incident from a second, ground-coupled sensor, wherein the second sensor includes a sensing element that measures the discharge time as a function of an impulse of the weapon fire incident received through the ground and data regarding a velocity of the second signal propagating at the speed of sound through the ground;

processing first sensor data from the one or more first sensors along with second sensor data from the second sensor using a relative time base between sensors;

determining a location of the weapon fire incident as a function of the first arrival time, the second arrival time, and the propagation velocities of the first signal and the second signal, wherein a minimization technique comprising a least squares routine is used in determining the location;

providing the location of the weapon fire incident as an output;

wherein an acoustic-based calculation of the location of the weapon fire incident is augmented by one or more range estimation or calculation techniques;

wherein the range estimation techniques includes use of a seismic sensor used to identify a muzzle blast, or a weapon-fire or a weapon-launch;

wherein the location is determined via an algorithm that includes determining intersection(s) between first data representative of the first propagation parameter and second data representative of the second propagation parameter;

wherein the sensors include two or more of: (a) 2 sensors having first propagation parameter sensing elements; (b) a single bearing sensor with multiple first propagation parameter sensing elements; and/or (c) a single $t_0$ (discharge time) sensor;

wherein the acoustic-based calculation is based on triangulation using the difference in time of arrival of acoustic transients at three or more sensor locations.

2. The method of claim 1 wherein the impulse through the ground propagates at either P-wave velocity or S-wave velocity.

* * * * *